United States Patent
Huss (10) Patent No.: US 8,967,947 B2
(45) Date of Patent: Mar. 3, 2015

(54) MAGNETICALLY ASSISTED KINETIC TURBINE SYSTEM

(76) Inventor: Leland H. Huss, Lafayette, CA (US)

(*) Notice: Subject to any disclaimer, the term of this patent is extended or adjusted under 35 U.S.C. 154(b) by 590 days.

(21) Appl. No.: 13/324,617

(22) Filed: Dec. 13, 2011

(65) Prior Publication Data

US 2013/0149152 A1 Jun. 13, 2013

(51) Int. Cl.
*F03D 3/02* (2006.01)

(52) U.S. Cl.
USPC .............................................. 415/10; 415/916

(58) Field of Classification Search
USPC ...... 416/3, 146 R, 197 A, 170 R; 415/10, 916
See application file for complete search history.

(56) References Cited

U.S. PATENT DOCUMENTS

| | | | |
|---|---|---|---|
| 4,151,431 A * | 4/1979 | Johnson | 310/12.24 |
| 4,321,005 A * | 3/1982 | Black | 415/4.2 |
| 5,997,252 A * | 12/1999 | Miller | 416/197 A |
| 6,194,798 B1 * | 2/2001 | Lopatinsky | 310/63 |
| 6,896,492 B2 * | 5/2005 | Masterton | 417/356 |
| 7,265,471 B2 * | 9/2007 | Sprain | 310/181 |
| 7,605,486 B2 * | 10/2009 | Bridwell | 290/43 |
| 2003/0052553 A1 * | 3/2003 | Isozaki et al. | 310/49 R |
| 2008/0231132 A1 * | 9/2008 | Minowa et al. | 310/114 |
| 2009/0004003 A1 * | 1/2009 | Hsiao et al. | 415/220 |
| 2009/0179432 A1 * | 7/2009 | Wattenbarger | 290/1 R |
| 2009/0196763 A1 * | 8/2009 | Jones et al. | 416/90 R |
| 2010/0181856 A1 * | 7/2010 | Chen | 310/154.01 |
| 2011/0062811 A1 * | 3/2011 | Freixas Vila | 310/152 |

* cited by examiner

Primary Examiner — Edward Look
Assistant Examiner — Aaron R Eastman
(74) Attorney, Agent, or Firm — Steven A. Nielsen; www.NielsenPatents.com (57) ABSTRACT

A system accepts outside kinetic energy in various forms such as wind, rain or waterfall and produces electricity by use of traditional coils and magnets or other means. During lulls in obtaining outside kinetic energy, a wind wheel, water wheel or arm system will slow down and eventually stop. A system of magnets installed upon an arm system and upon a surrounding stationary housing 800 assists in rotating an arm system such that the arm system will require additional time to stop after a lull in outside kinetic energy. The artful placement and orientation of stationary housing magnets 250 in relation to moving arm magnets 200 assists in rotating an arm system powered by outside kinetic forces. The angles of the stationary housing magnets urge the arm magnets to move in the desired direction 900 of rotation. The system increases mechanical efficiency.

9 Claims, 15 Drawing Sheets

Basic "Strip" Wind Foil Design

Angle

Fig. 15

Front
(Face on)

Fig. 16

Side

Fig. 17

"Winged" Wind Foil Design

Angle

Fig. 18

Front
(Face on)

Fig. 19

Side

Fig. 20

MAGNETICALLY ASSISTED KINETIC TURBINE SYSTEM

BACKGROUND OF THE INVENTION (1) Field of the Invention

The invention generally relates to systems and methods of increasing mechanical efficiency. More particularly, embodiments of the invention relate to using magnetic forces to increase the efficiency of a kinetic turbine system.

(2) Description of the Related Art

Kinetic turbine systems used to generate electricity are known in the related art. In the prior art, windmills, waterwheels or other kinetic systems spin wire windings near magnets to generate electricity. Friction along the rotational shaft creates heat and otherwise reduces the power transmitted by the system. Thus, there is room in the art for new means and methods of increasing the mechanical efficiency of turbine systems.

BRIEF SUMMARY OF THE INVENTION

The present invention overcomes shortfalls in the related art by presenting an unobvious and unique combination, configuration and use of stationary magnets held in place and on either side of a rotational arm, such has a windmill arm, and where the rotational arm also has magnets. All of the system magnets have North and South orientations and are artfully positioned so as to assist in the rotation of windmill or waterwheel arms as such arms are rotated by outside kinetic forces. As an arm rotates within a disclosed stationary housing, magnetic repulsions between the stationary magnets and moving arm magnets increase the duration of inertial energy release of the arm system, such that when the outside kinetic energy ceases, the arm system continues in rotation for an unexpectedly long period of time.

REFERENCE NUMERALS IN THE DRAWINGS

Vector A a magnetic force from a North end of a stationary housing magnet 250
Vector C a magnetic force from a North end of an arm magnet 200
α angle of a stationary housing magnet 250 with respect to stationary housing panel 315
110 one embodiment of the invention in general
200 arm magnet having a North end 200N and a South end 200S
200N North end of arm magnet 200
200S South end of arm magnet 200
250 stationary housing magnet having a North end 250N and a South end 250S
250N North end of a stationary housing magnet 250
250S South end of a stationary housing magnet 250
310 upper brace sometimes used to attach an outside stator 600 to a stationary housing panel 315
312 lower brace sometimes used to attach an outside stator 600 to a stationary housing panel 315
315 stationary housing panel
316 inside circle of housing magnet 250 alignment
317 an inner side of a stationary housing panel, the inner side being toward the arms 810 and an opposite stationary housing panel
320 support leg of housing assembly
325 base of housing assembly
330 housing assembly, comprising a base 325, support legs 320 and stationary housing panel 315
335 lower inside stator support connecting an inside stator 650 to a stationary housing panel 315
336 upper inside stator support connecting an inside stator 650 to a stationary housing panel 315
340 flux gap found between an outside stator 600 and a flux rotor 500
500 flux rotor, rotates upon an axle 700 and between an inside stator 650 and outside stator 600
510 magnets on either side of flux rotor 500
600 outside stator in general
610 coil windings of outside stator 600
620 platform or housing of outside stator 600
650 inside stator in general
670 coil windings of inside stator 650
700 axle
800 arm housing
810 arm
820 kinetic scoop
825 open cup area of kinetic scoop
830 back side of kinetic scoop
900 direction of axial rotation These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

Figure 1:
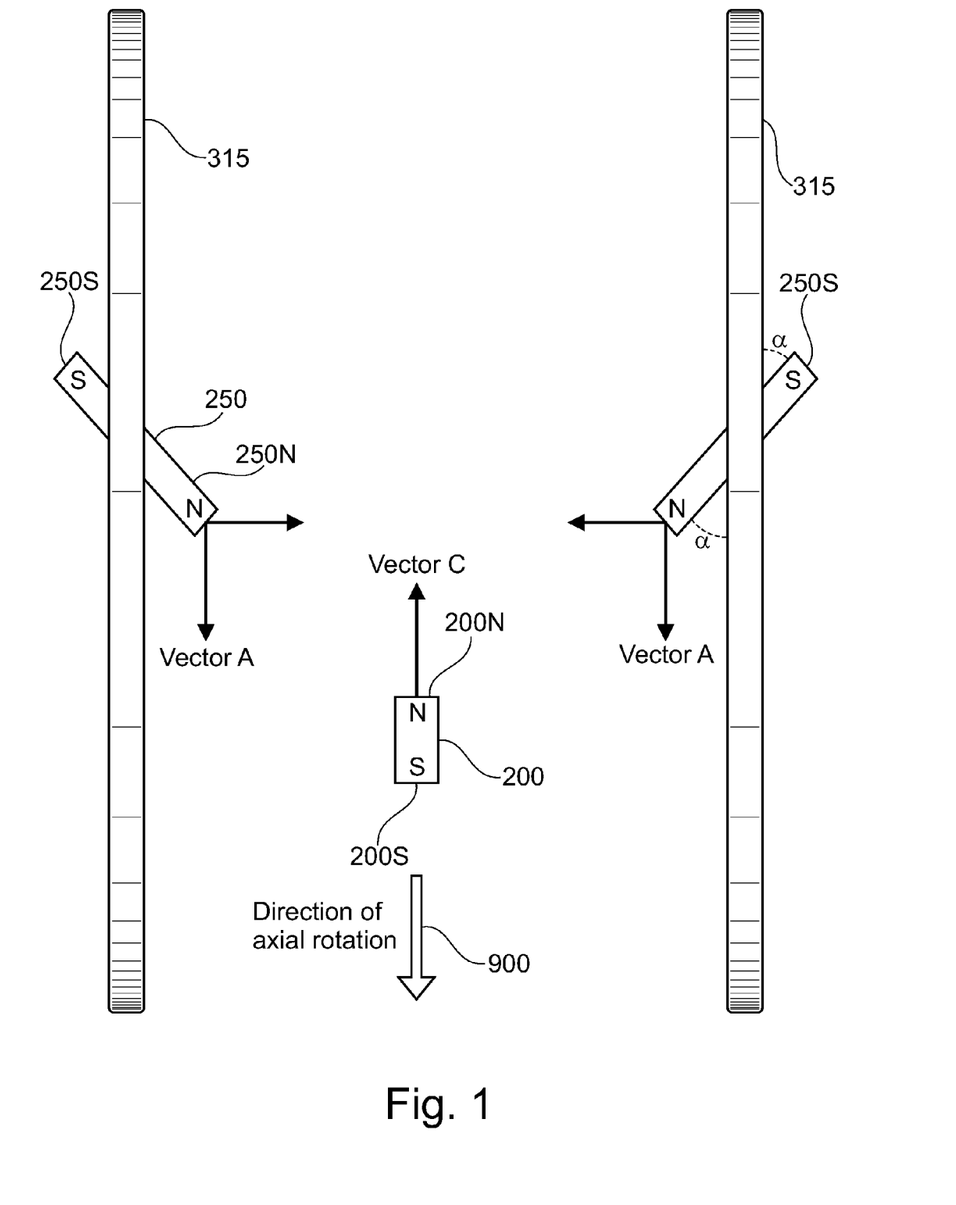
FIG. 1 depicts component magnetic vectors of an arm magnet and housing magnets

In FIG. 1 two stationary housing panels 315 are on either side of an arm magnet 200, the arm magnet shown with a S side or Southside 200S and with a N side or North side generating force vector C.

The stationary housing panels 315 are shown with stationary housing magnets 250 having a South side 250S pointing away from the arm magnet 200. The North side 250N of the stationary housing magnets are shown generating force vectors A in opposition to force vector C of the arm magnet 200. Outside kinetic energy from wind, rain or other forces (not shown) moves the arm magnet 200 in the direction of axial rotation 900. The repulsion of vectors A against Vector C assists in the movement caused by outside kinetic forces.

The stationary magnets 250 may be set within a stationary housing panel an angle α in the range of 20 to 70 degrees.

Figure 2:
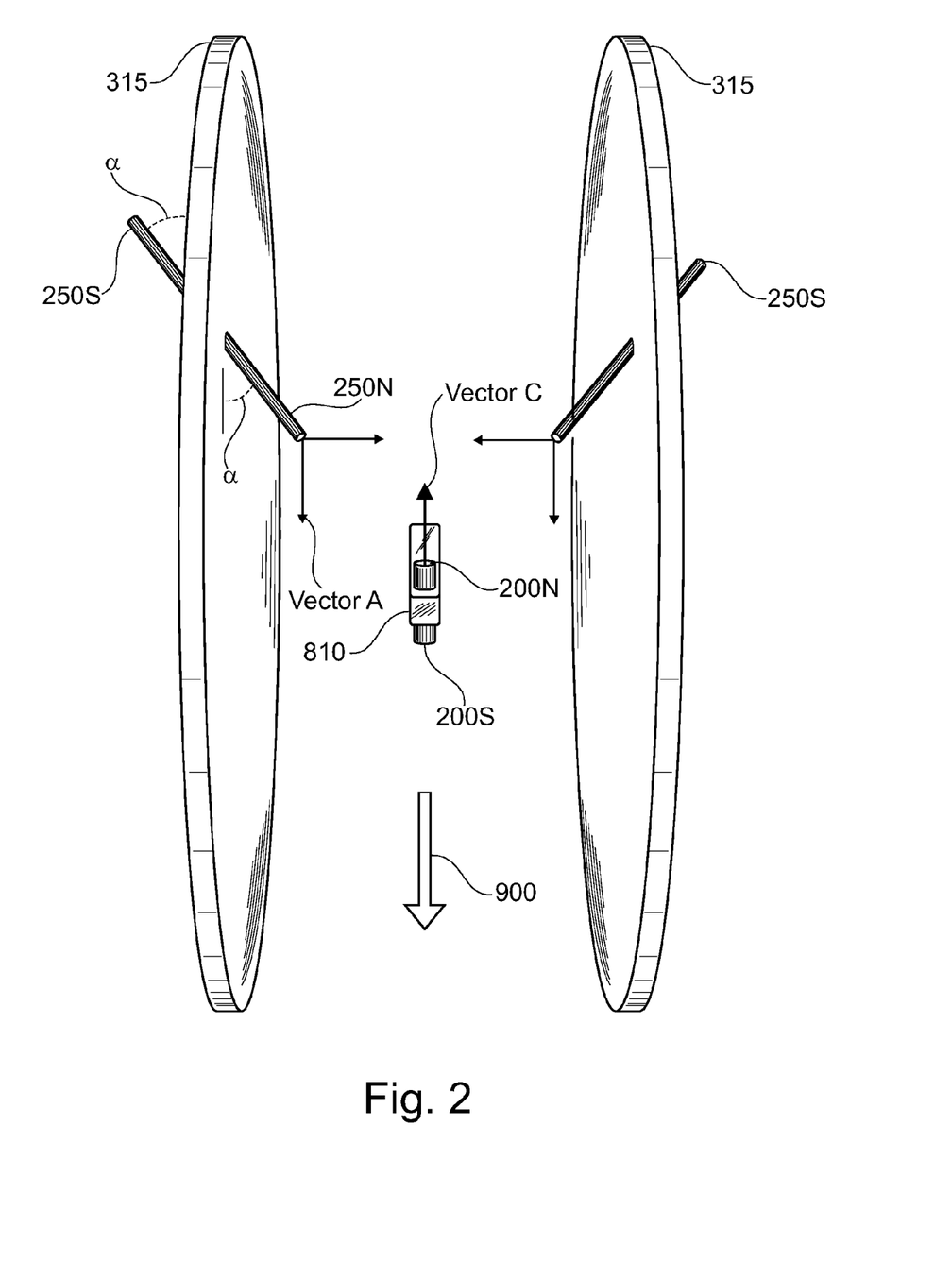
FIG. 2 depicts component magnetic vectors of an arm magnet and housing magnets

In FIG. 2 an arm 810 is shown to support an arm magnet and the South side 200S is shown to be pointed in the direction of axial rotation 900 while the North side 200N of the arm magnet is shown to be pushed by vectors A generated from the North sides 250N of two stationary housing magnets.

Figure 3:
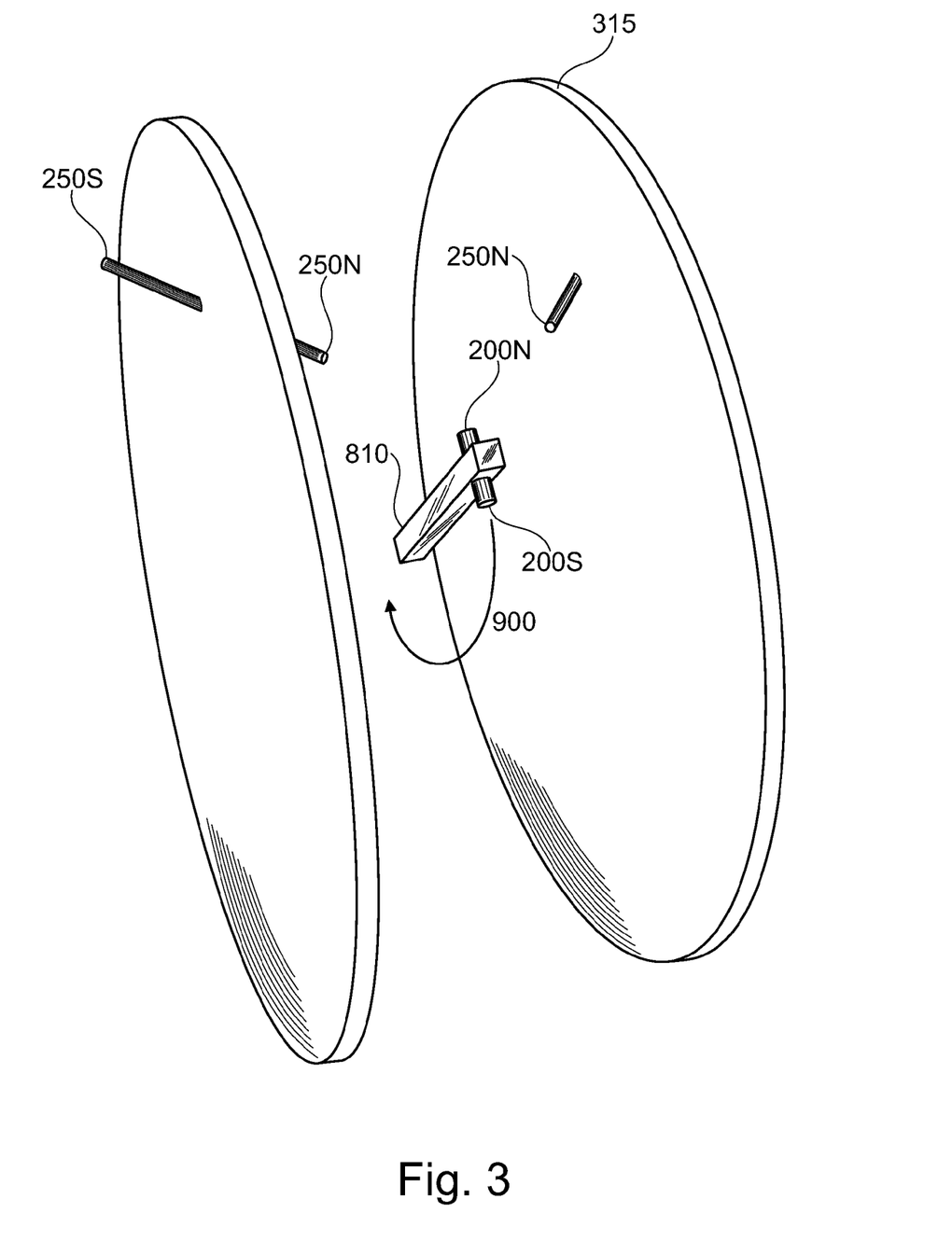
FIG. 3 depicts a perspective view of an arm and housing

In FIG. 3 presents a fuller view of arm 810 supporting each side of an arm magnet. The axis of rotation 900 is more clearly shown to be toward the South side 200S of the arm magnet.

Figure 4:
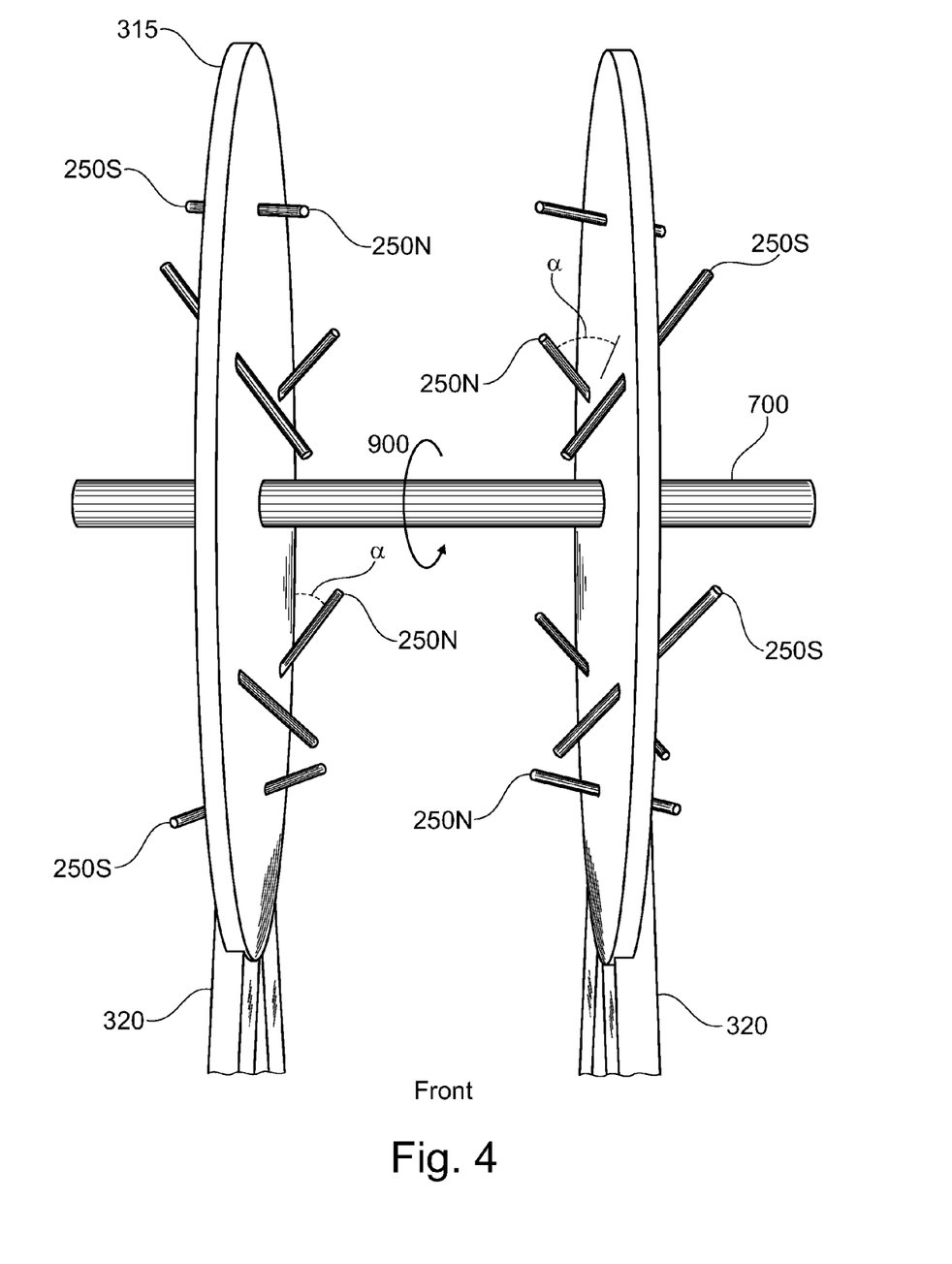
FIG. 4 depicts an axial attached to two housing members

In FIG. 4 an axial 700 is shown to be supported by two stationary housing panels. The axle spins within the two stationary housing panels, by means of bearings or other means. A plurality of South sides 250S and North sides 250N of stationary magnets are shown to be secured to a stationary housing panel. Support legs 320 are shown in attachment to the stationary housing panels 315. No arm or arm magnet is shown in FIG. 4.

Figure 5:
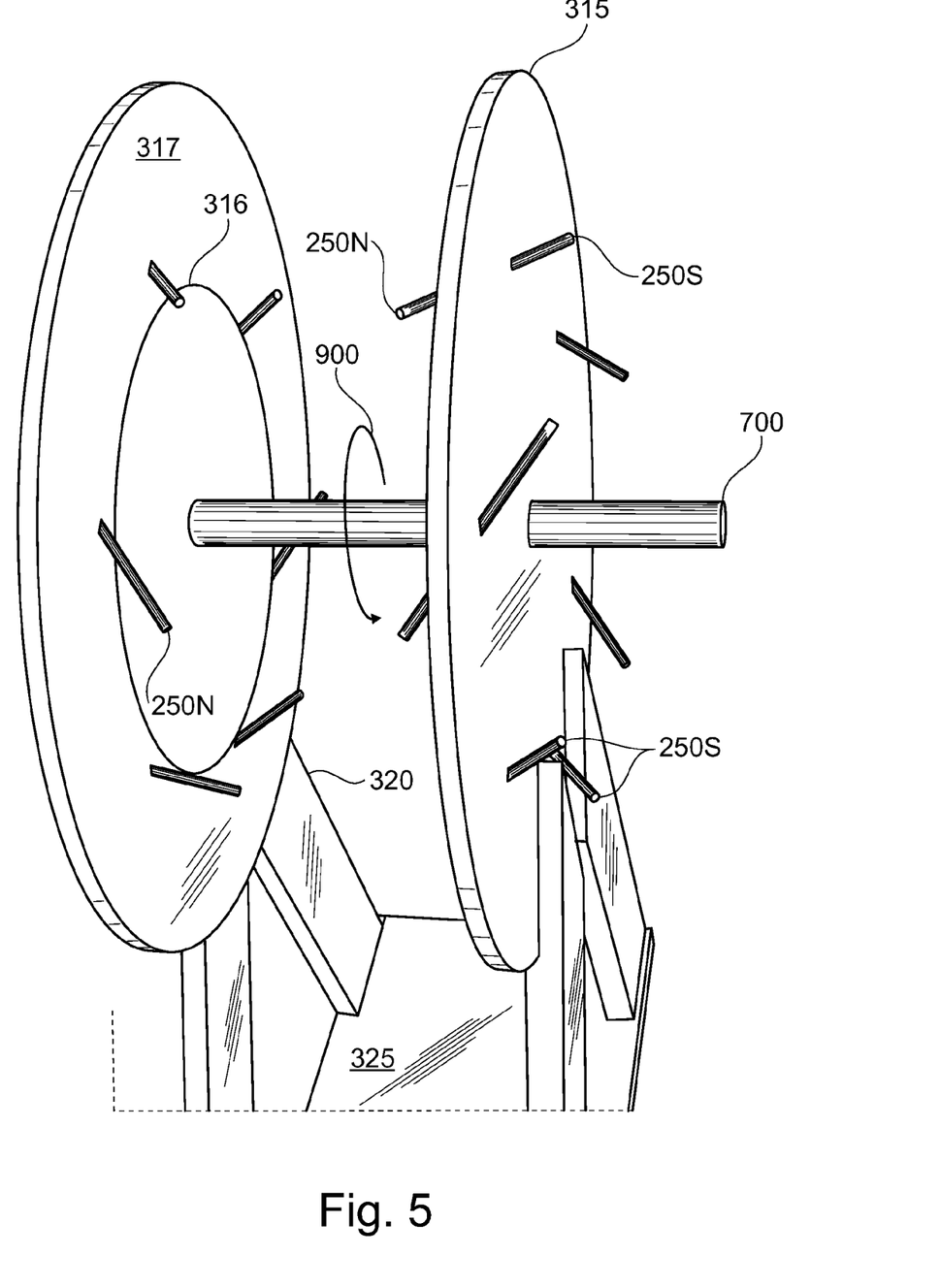
FIG. 5 depicts a top view of an axial in rotation and attached to two housing members

FIG. 5 introduces an inside circle 316 of housing magnet alignment. Center lines of the housing magnets are tangent to the inside circle 316.

Figure 6:
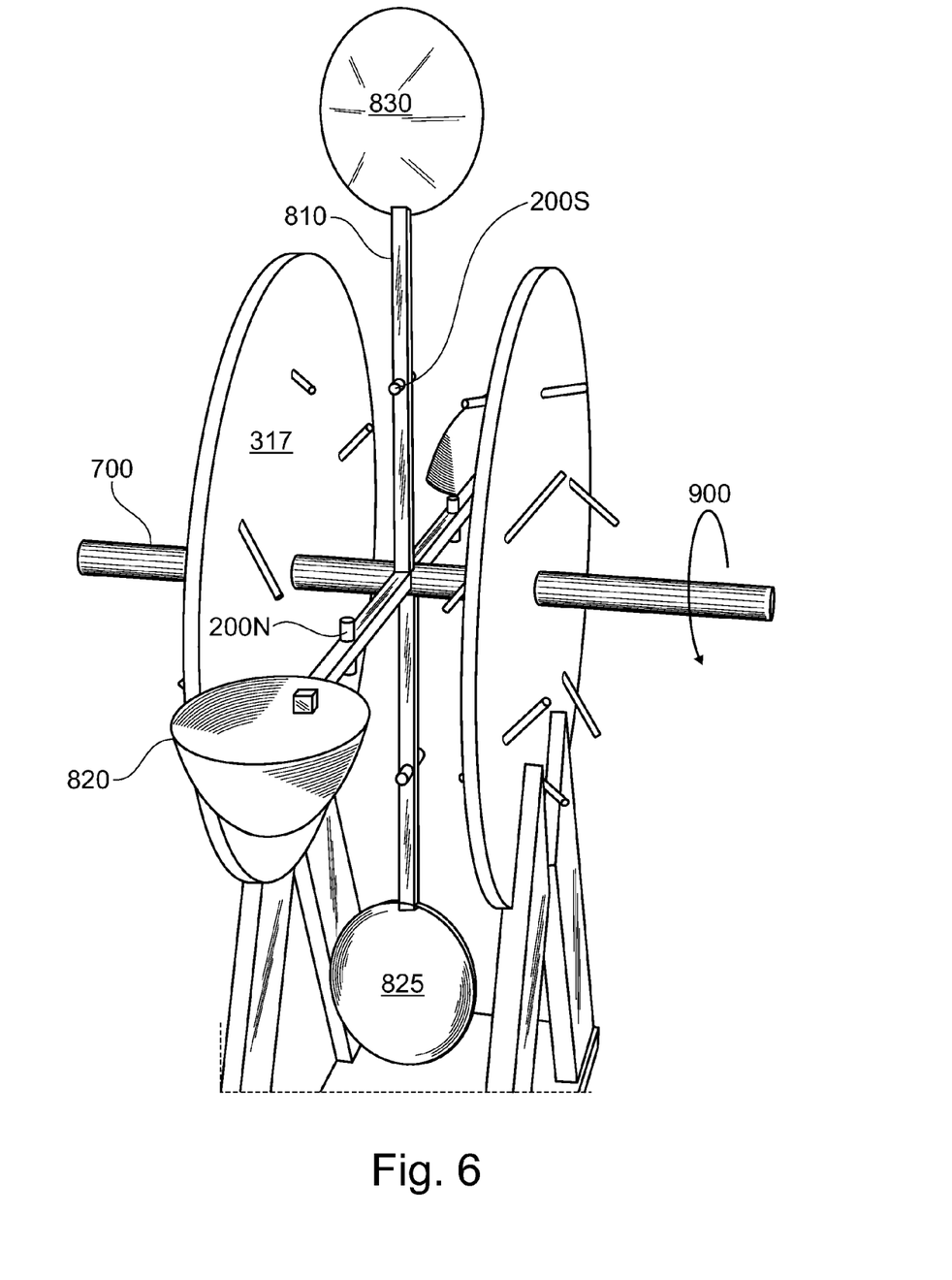
FIG. 6 depicts one embodiment of the invention

FIG. 6 depicts a plurality of arms 810 attached to the axle 700. Each arm has an arm magnet with each arm magnet having a South side 200S and North side 200N. At the end of each arm a kinetic scoop 820 is attached. Each kinetic scoop may have an open cup area 825 to accept wind, rain or other kinetic energy. On the opposite side of an open cup area may be a back side 820 of a kinetic scoop. The back side 820 is designed to deflect wind, rain or other kinetic energy.

Figure 7:
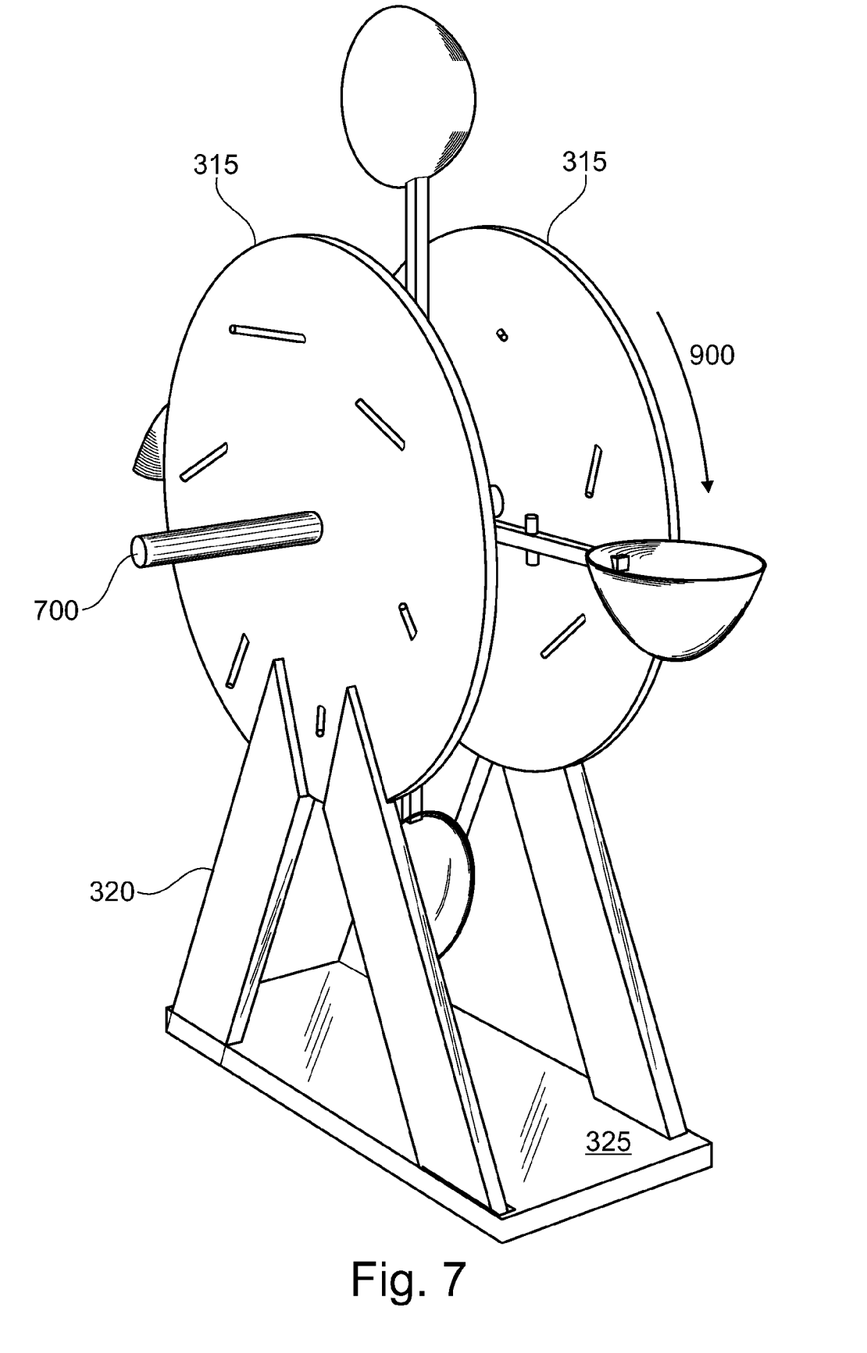
FIG. 7 depicts a perspective side view of one embodiment of the invention
Figure 8:
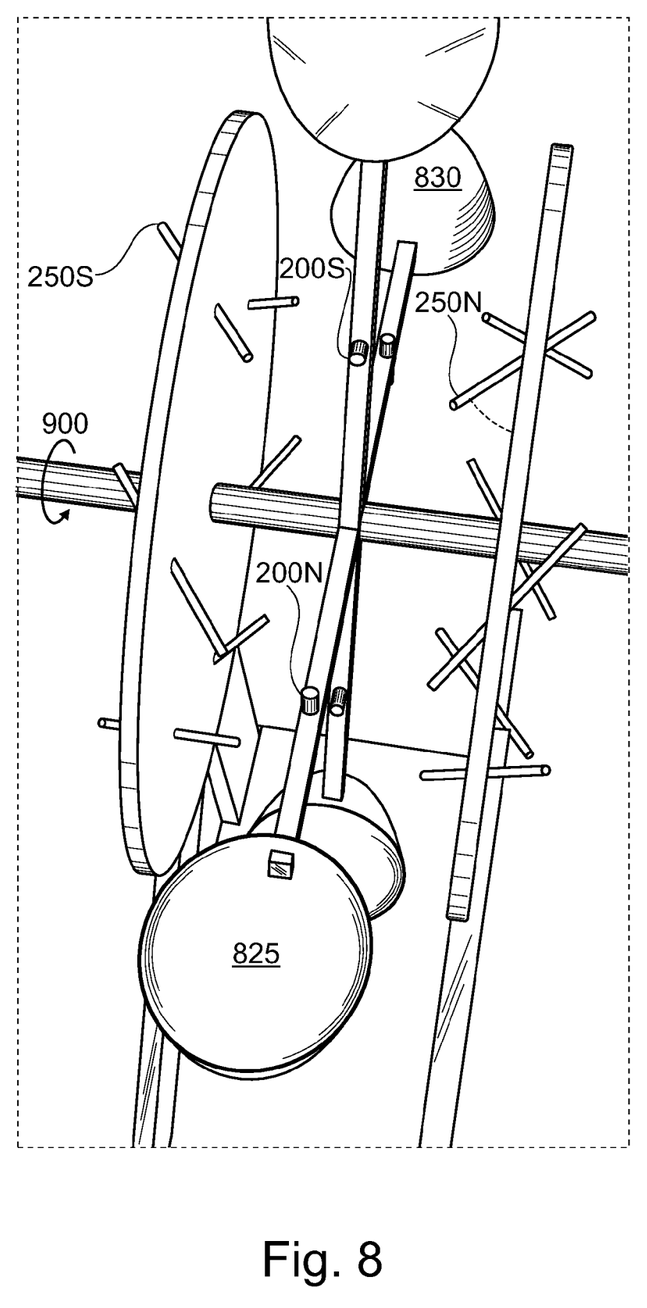
FIG. 8 depicts arm magnets and housing magnets

FIG. 7 depicts a side perspective view of one embodiment of the invention. FIG. 8 presents a top view of kinetic scoops rotating an axle with arm magnets being pushed by stationary magnets.

Figure 9:
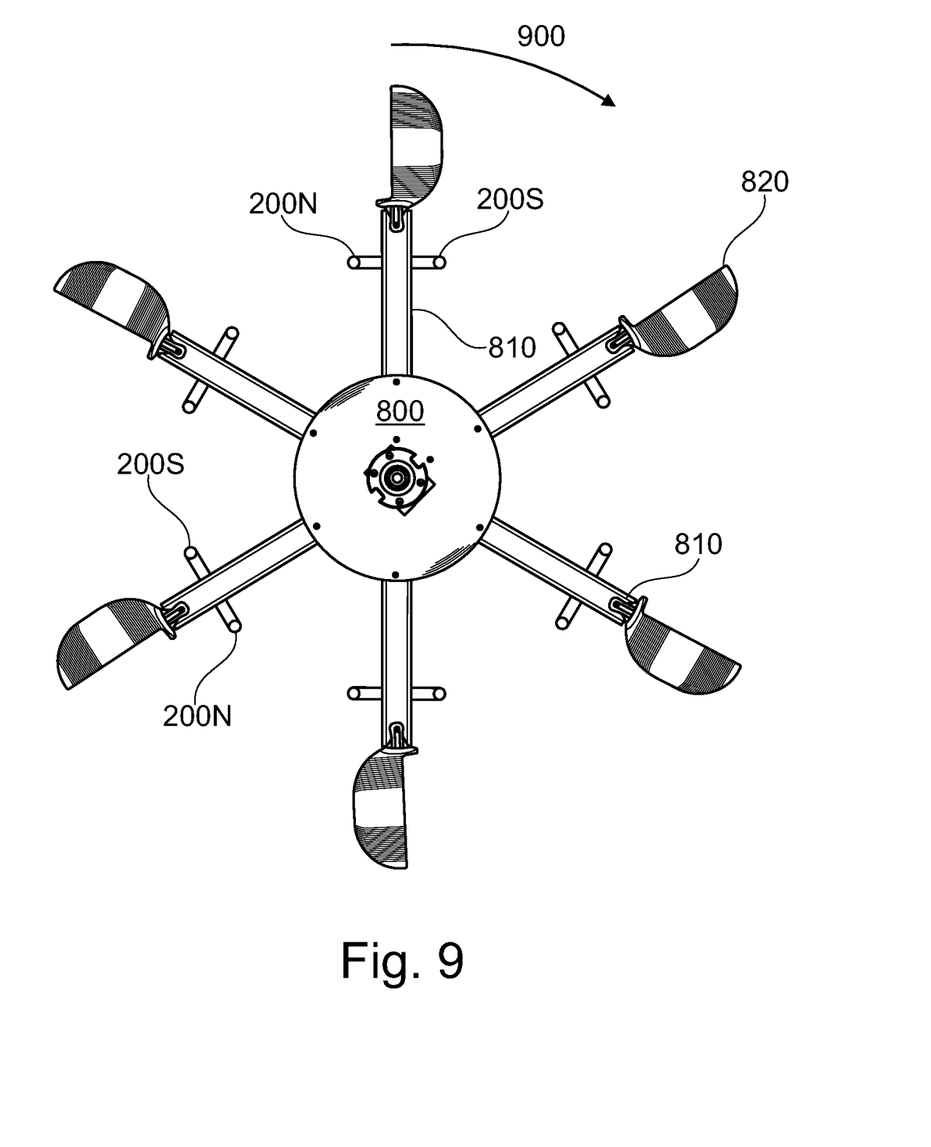
FIG. 9 is a plan view of one arm embodiment with arm magnets

FIG. 9 depicts a plan view of one embodiment of arms 810 in attachment to an arm housing 800. The center area of the arm housing may attach to an axle. The distal end of each arm has a kinetic scoop. Each arm also supports an arm magnet with each arm magnet having a North end 200N and South end 200S.

Figure 10:
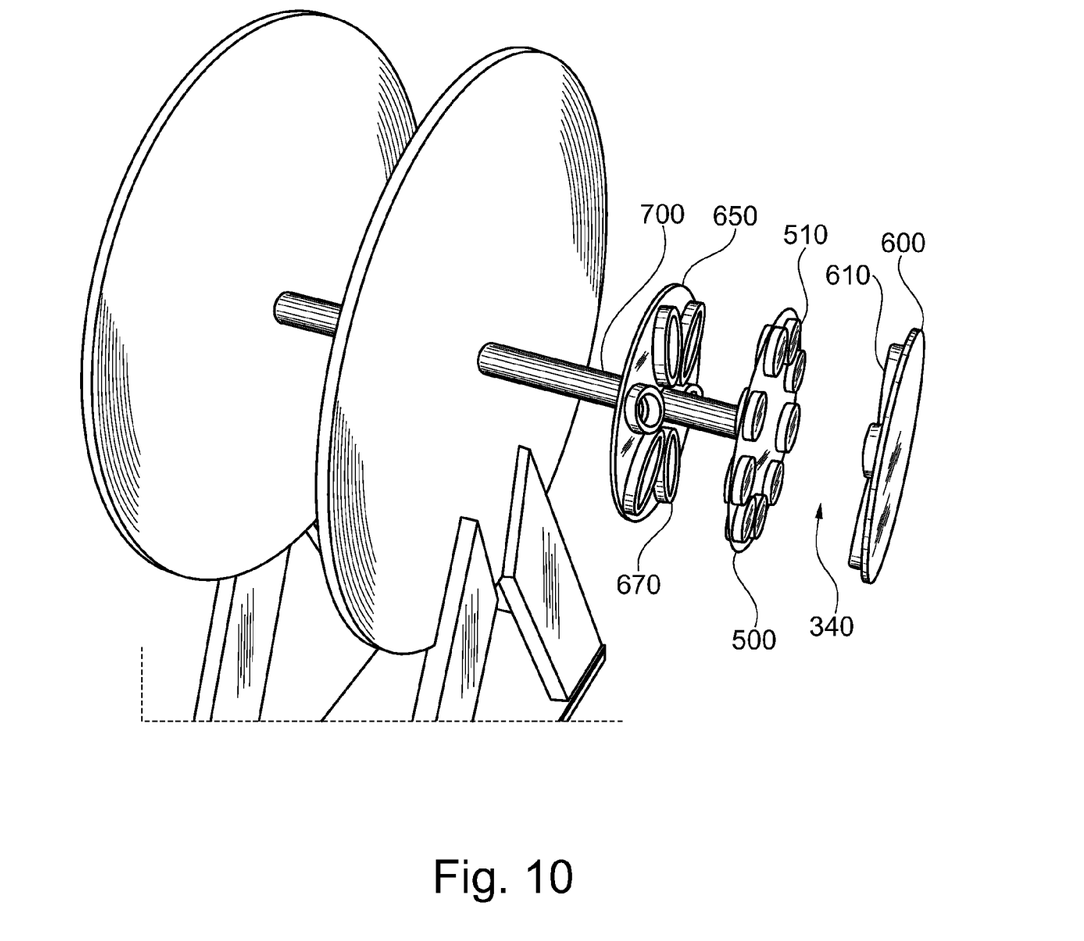
FIG. 10 is a perspective view of an unassembled stator system

FIG. 10 depicts an axle 700 going through the center of an inside stator 650. The axle is attached to a flux rotor 500, such that the flux rotor 500 rotates with the axle 700. Both the inside stator 650 and outside stator 600 remain in a stationary position. The outside stator has coils 610 or windings and the inside stator also has coils 670 or windings. The flux rotor 500 has magnets 510 on either side such that flux rotor magnets 500 face both the inside stator and outside stator. When the axle is rotated, the stators and flux rotor generate electricity.

Figure 11:
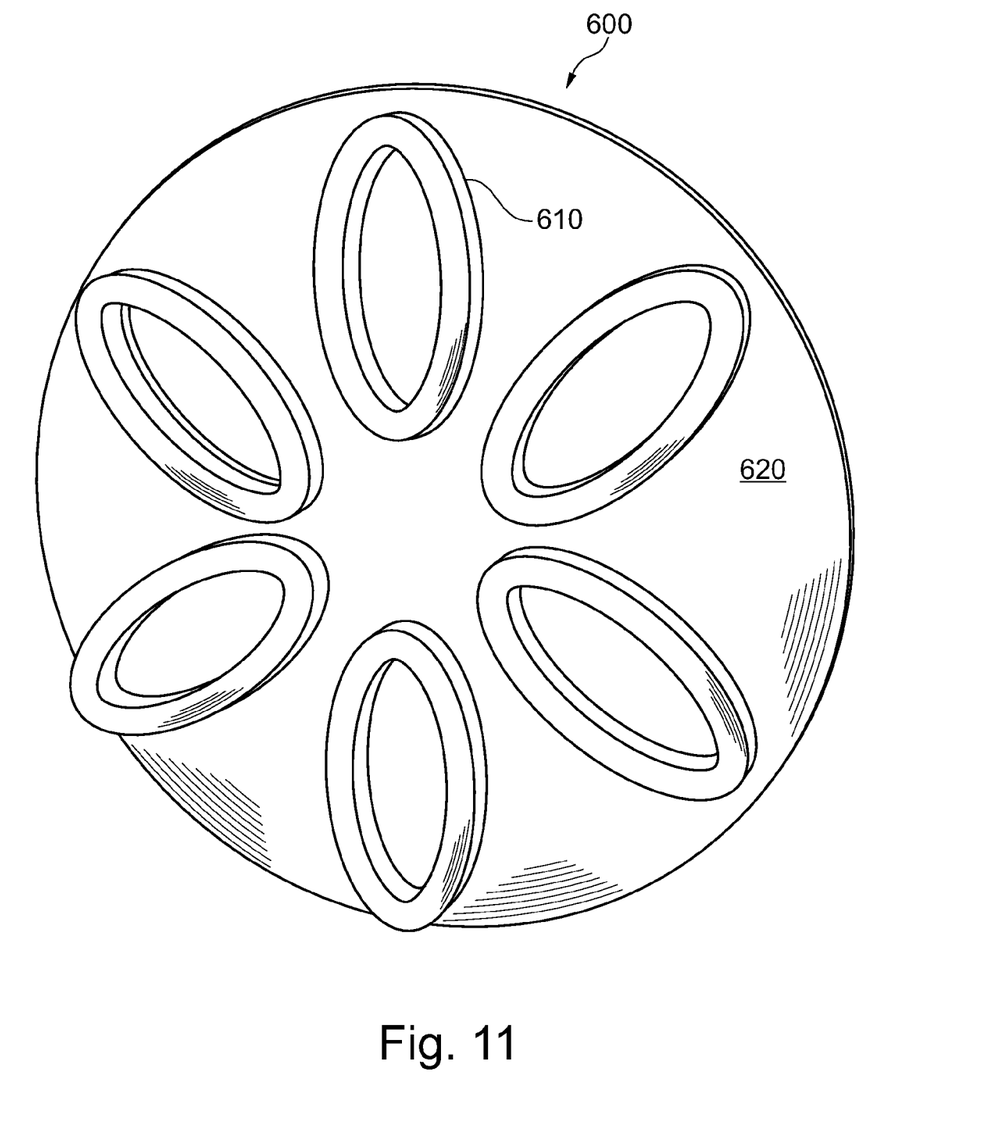
FIG. 11 is a perspective view of an outside stator

FIG. 11 depicts an outside stator 600 and shows a platform 620 or housing which supports coil windings 610.

Figure 12:
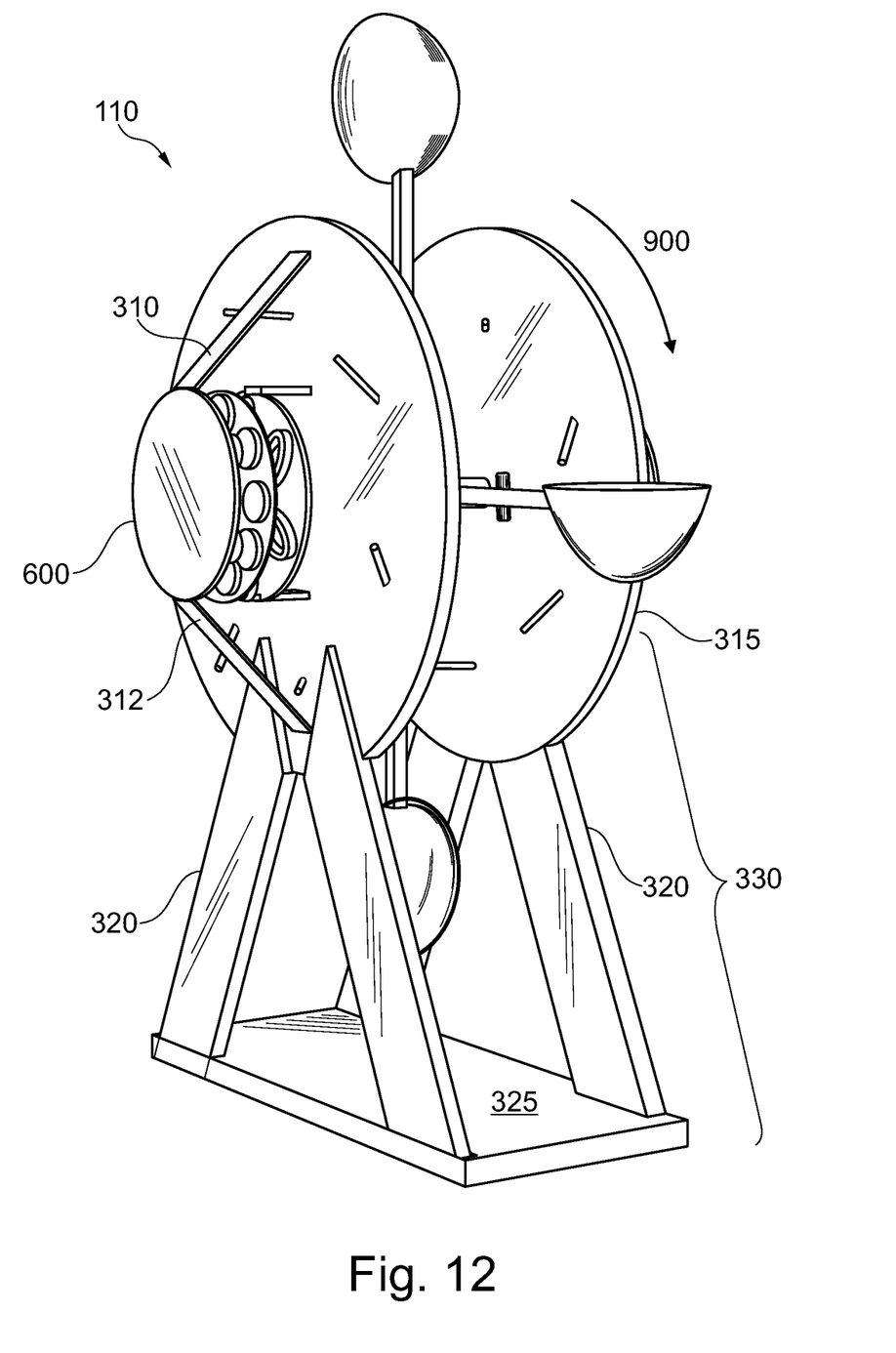
FIG. 12 is a perspective view of one embodiment of the invention

FIG. 12 depicts a housing assembly 330 comprising a base 325, support legs 320 and a stationary housing panel 315. The outside surfaces of the stationary housing panels 315 are shown to support an outside stator 600 by use of a lower brace 312 and an upper brace 310.

Figure 13:
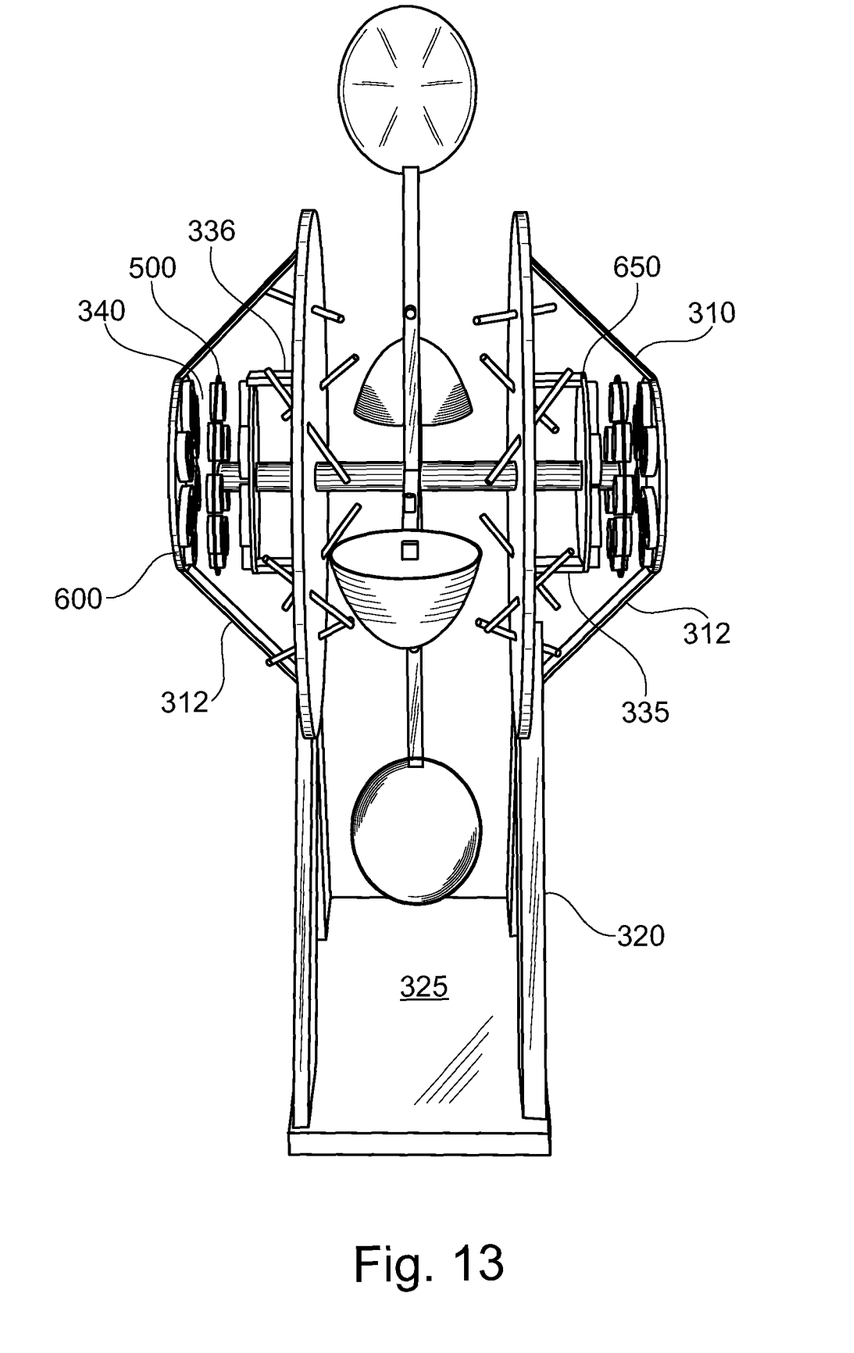
FIG. 13 depicts one embodiment of the invention

FIG. 13 depicts one embodiment of the invention. The two inside stators 650 are supported by a lower support 335 and an upper support 336 with both supports attaching to an outside surface of a stationary housing panel.

Figure 14:
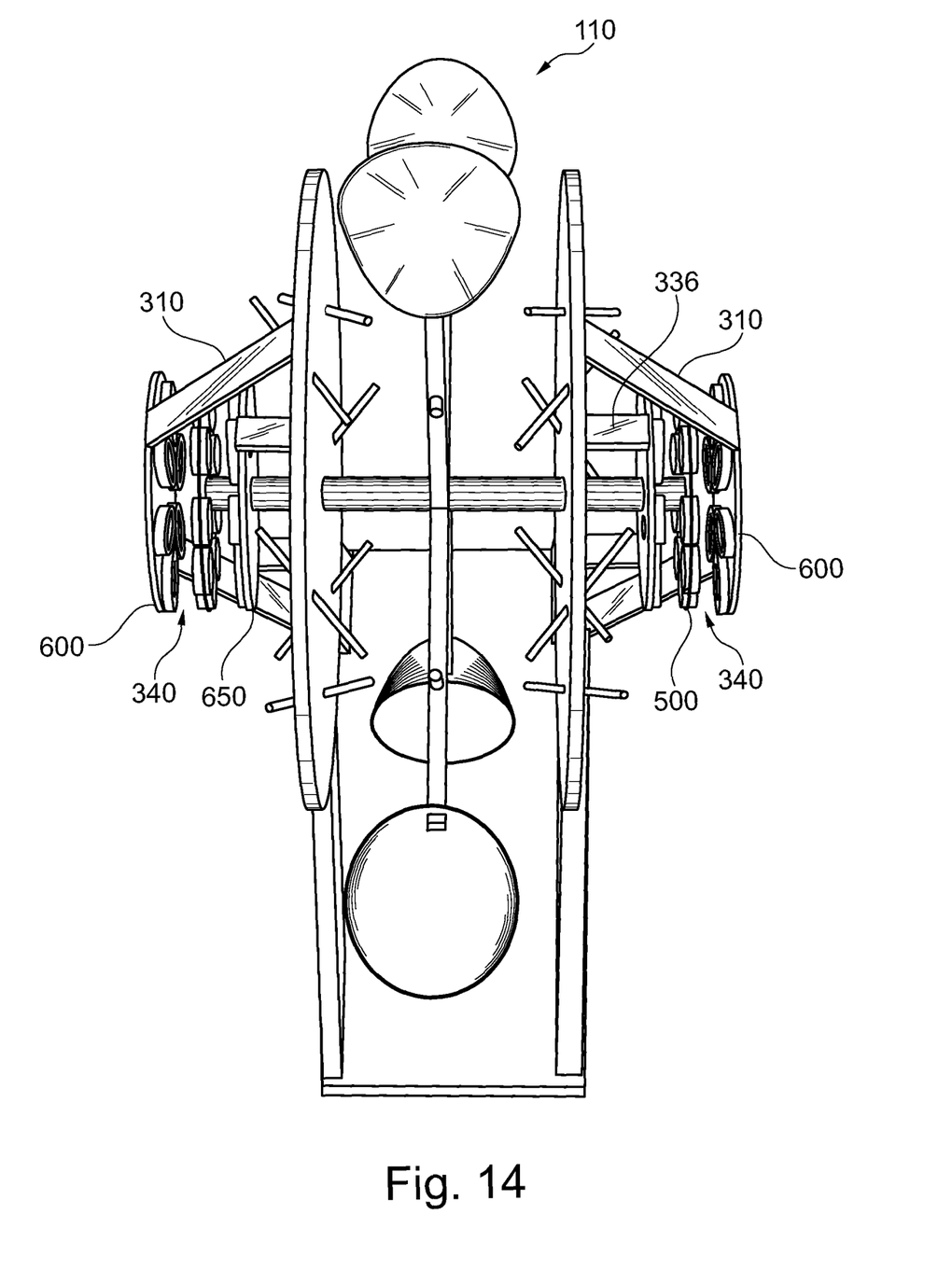
FIG. 14 depicts a top view of one embodiment of the invention

FIG. 14 depicts a flux gap 340 found between a flux rotor 500 and outside stator 600.

Figure 15:
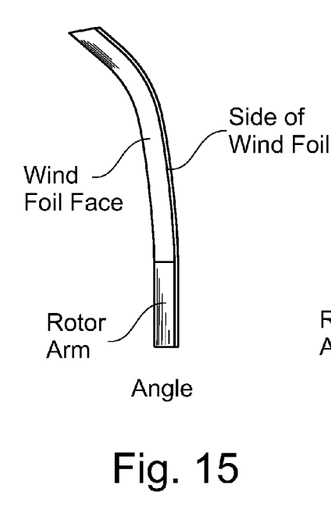
FIG. 15 depicts a side perspective view of a wind foil
Figure 16:
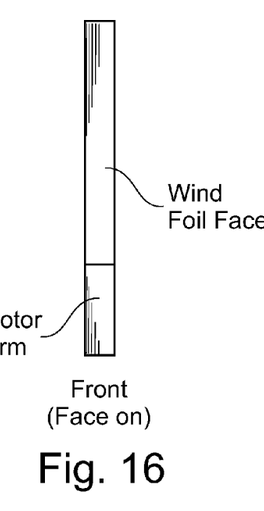
FIG. 16 depicts a front view of a wind foil
Figure 17:
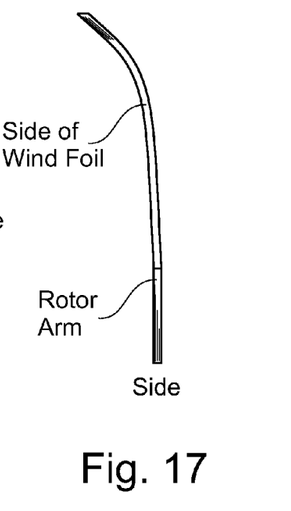
FIG. 17 depicts a side view of a wind foil

FIG. 15 presents a basic "Strip" wind foil design having a wind foil face, side of wind foil with the strip attached to rotor arm. FIG. 16 presents a front plan view of a basic "Strip" wind foil design. FIG. 17 depicts a side view showing the top portion of the Strip to be curved.

Figure 18:
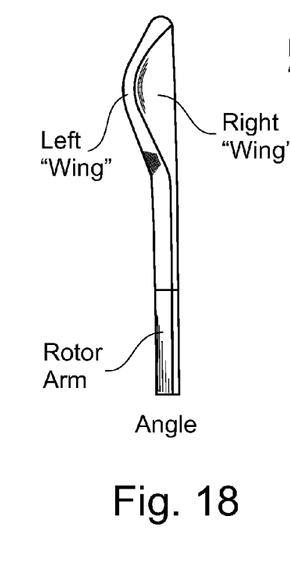
FIG. 18 depicts a side perspective view of a winged wind foil
Figures 19, 20:
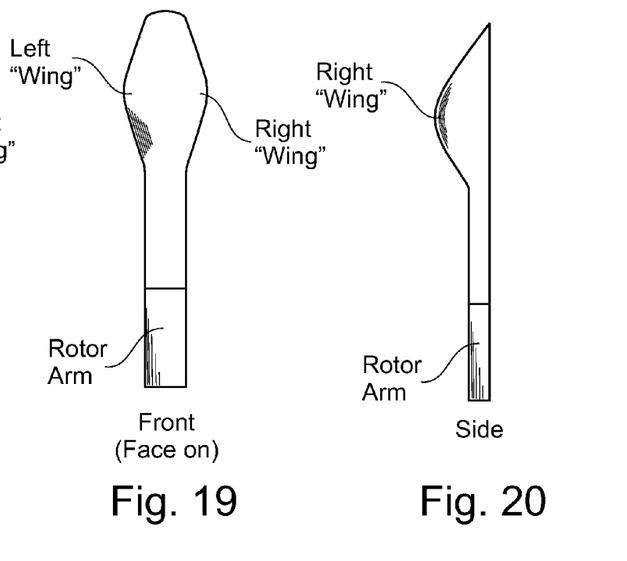
FIG. 19 depicts a front view of a winged wind foil
FIG. 20 depicts a side view of a winged wind foil

FIG. 18 depicts a perspective view of a "Winged" foil design having a left wing and a right wing, with each wing attached to a curved shaft area such that a V or U shape occurs between the wings and along the shaft. FIG. 19 depicts a front plan view of a "Winged" wind foil design. FIG. 20 depicts a side view of a "Winged" foil design.

While the terms North and South are used herein to describe orientations of various magnets, the inventor contemplates other orientations yielding the same result. An object of the invention is to increase the mechanical efficiency of a kinetically powered device. No attempt is being made to use magnetic forces alone to rotate the shaft or to otherwise generate electricity.

Embodiments of the disclosed systems and methods include the following items:

1. A method of enhancing the momentum of a rotating body moved into rotation by outside kinetic forces, the method comprising the steps of:
   a) using magnetic force from a plurality of stationary housing magnets 250 in opposition to the magnetic force from a plurality of arm magnets 200 to assist in the rotation of an axle 700, the axle being originally rotated by kinetic forces applied to a plurality of kinetic scoops 820, with each kinetic scoop attached to the axle by use of an arm 810; and
   b) using similar polarity of stationary housing magnets to similar polarity of arm magnets to urge the arm magnets in the direction 900 of axial rotation.

2. The method of 1 including the step of using stationary housing magnets 200 placed in a circular alignment 316 upon a stationary housing 315 such that each stationary housing magnet is tangent to the circular alignment and such that each stationary housing magnet is 20 to 70 degrees from an inner planer surface 317 of the stationary housing.

3. The method of 2 including the step of using kinetic scoops 820 having a first side with an open cup area 825 and a second side with a back side 830 in a convex shape.

4. The method of 3 including the step of generating electricity by use of a stator and flux system having a stationary inside stator 600, a rotating flux rotor 500 and a stationary outside stator 600 wherein the axle 700 rotates the flux rotor with in the stationary inside and outside stators and wherein the axle moves freely and through a hollow center section of the inside stator.

5. The method of 4 using:
   a) a housing assembly 330 to elevate the stationary housing panels, the housing assembly comprising a base 325, support legs 320 and stationary housing panels;
   b) securing the inside stators 650 to the stationary housing panels by use of lower inside stator supports 335 and upper inside stator supports 336; and
   c) securing the outside stators 600 to the stationary housing panels by use of lower braces 312 and upper braces 310.

6. A system of enhancing the momentum of a rotating axle 700 moved into rotation by outside kinetic forces, the system comprising:
   a) an axle 700 rotating within two stationary housing members 315;
   b) a plurality of arms 810 attached to the axle at the proximal end of each arm and each arm having one or more arm magnets 200 with each arm magnet 200 having a North side 200N and a South side 200S;
   c) each arm 810 having a distal end attached to a kinetic scoop 820;
   d) each stationary housing member having an inner planer surface 317 with an inside circle 316 of housing magnet alignment;
   e) each stationary housing member having a plurality of stationary housing magnets 250 positioned tangent to the inside circle 316 of housing magnet alignment; and
   d) each stationary housing magnet protruding outwardly from the inner planer surface 317 of a stationary housing member 315 at an angle α of between 20 to 70 degrees.

The system of 6 wherein each kinetic scoop 820 comprises a concave side and an opposite convex side.

The system of 7 wherein each kinetic scoop comprises a wind foil FIG. 15 having a curved face.

The system of 8 wherein each kinetic scoop comprises a winged foil FIG. 18 having a right side and a left side connected together at an angle of between 10 and 180 degrees.

While certain aspects of the invention are presented below in certain claim forms, the inventor contemplates the various aspects of the invention in any number of claim forms.

What is claimed is:

1. A system comprising:
   a) a plurality of kinetic scoops, with each kinetic scoop attached to an axle by use of an arm and each arm attached to an arm magnet with each arm magnet exposed on each side of its respective arm and each arm magnet having a South end facing in a direction of intended rotation and North end facing opposite to the direction of intended rotation;
   b) the axle supported by a pair of stationary housing panels with each stationary housing panel attached to a plurality of stationary housing magnets, the stationary housing magnets having North ends facing the arms and South ends facing away from the arms and the stationary housing magnets evenly disposed around the entire perimeter of the stationary housing panels.

2. The system of claim 1 wherein the stationary housing magnets are disposed in a circular alignment upon each stationary housing such that each stationary housing magnet is tangent to the circular alignment and such that each stationary housing magnet is 20 to 70 degrees from an inner planar surface of the stationary housing.

3. The system of claim 2 wherein the kinetic scoops have a first side with an open cup area and a second side with a back side in a convex shape.

4. The system of claim 3 including a stator and flux system comprising a stationary inside stator, a rotating flux rotor and a stationary outside stator wherein the axle rotates the flux rotor within the stationary inside and outside stators and wherein the axle moves freely and through a hollow center section of the inside stator.

5. The system of claim 4 further comprising:
   a) a housing assembly to elevate the stationary housing panels, the housing assembly comprising a base, support legs and stationary housing panels;
   b) securing the inside stators to the stationary housing panels by use of lower inside stator supports and upper inside stator supports; and
   c) securing the outside stators to the stationary housing panels by use of lower braces and upper braces.

6. A system comprising:
   a) an axle rotating within two stationary housing members;
   b) a plurality of arms attached to the axle at a proximal end of each arm and each arm having one or more arm magnets with each arm magnet having a North side and a South side;
   c) each arm having a distal end attached to a kinetic scoop;
   d) each stationary housing member having an inner planar surface with an inside circle of housing magnet alignment;
   e) each stationary housing member having a plurality of stationary housing magnets positioned tangent to the inside circle of housing magnet alignment and the stationary housing magnets evenly disposed around the entire circumference of its respective stationary housing member; and
   f) each stationary housing magnet protruding outwardly from the inner planar surface of a stationary housing member at an angle of between 20 to 70 degrees.

7. The system of claim 6 wherein each kinetic scoop comprises a concave side and an opposite convex side.

8. The system of claim 6 wherein each kinetic scoop comprises a wind foil having a curved face.

9. The system of claim 6 wherein each kinetic scoop comprises a winged foil having a right side and a left side, the two sides being connected together at an angle of between 10 and 180 degrees.

* * * * *